(12) United States Patent
Rapakko et al.

(10) Patent No.: US 7,308,642 B2
(45) Date of Patent: Dec. 11, 2007

(54) METHOD AND DEVICE FOR HANDLING SYNCHRONIZATION RELATED INFORMATION

(75) Inventors: Jouni Rapakko, Kuylmäkoski (FI); Mika Martikainen, Lempäälä (FI); Sami Pajusaari, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 417 days.

(21) Appl. No.: 10/411,074

(22) Filed: Apr. 9, 2003

(65) Prior Publication Data

US 2003/0212826 A1    Nov. 13, 2003

(30) Foreign Application Priority Data

Apr. 15, 2002    (WO)    ............... PCT/IB02/01203

(51) Int. Cl.
G06F 17/00    (2006.01)
(52) U.S. Cl. .................... 715/500.1; 715/515
(58) Field of Classification Search ............. 715/500.1, 715/515
See application file for complete search history.

(56) References Cited

U.S. PATENT DOCUMENTS

| | | | | |
|---|---|---|---|---|
| 6,925,481 | B2* | 8/2005 | Singhal et al. | 709/200 |
| 6,934,756 | B2* | 8/2005 | Maes | 709/227 |
| 2002/0059465 | A1* | 5/2002 | Kim | 709/248 |
| 2003/0103554 | A1* | 6/2003 | Li et al. | 375/141 |

FOREIGN PATENT DOCUMENTS

| | | |
|---|---|---|
| WO | 0217075 | 2/2002 |
| WO | 0227540 | 4/2002 |

OTHER PUBLICATIONS

Jonsson, A., et al, "SyncML—Getting the Mobile Internet in Sync", Ericcson Review, Nov. 3, 2001, pp. 110-115.*
Roth, Jorg, "Patterns of Mobile Interaction", Personal and Ubiquitous Computing, vol. 6, Issue 4, Jan. 2002, pp. 282-289.*
Courtiat, J.P. et al, "Towards a New Multimedia Synchronization Mechanism and its Formal Definition", Proceedings of the Second ACM International Conference on Multimedia, Oct. 1994, pp. 133-140.*
Hurst, W., et al, "A Synchronization Model for Recorded Presentations and Its Relevance for Information Retrieval", Proceedings of the Seventh ACM International Conference on Multimedia (Part 1), Oct. 1999, pp. 333-342.*

(Continued)

Primary Examiner—William L. Bashore
Assistant Examiner—Laurie Ries

(57) ABSTRACT

SyncML allows synchronization to take place between a terminal device and a server device. To be able to understand each other the data transferred between a SyncML client and a SyncML server must be coded as a SyncML document. The coding or decoding/parsing of the SyncML document is done by the separate application components, respectively, that other end-user applications (e.g. a UI application) can use. It is not always wanted, advantageous or even possible to employ the SyncML coding/decoding feature, since it is subjected to several disadvantages. The present disclosure provides a concept to still use the synchronization related components for communicating synchronization data between the participating devices but without employing the coding/decoding component feature. The response of coding and decoding the synchronization data is transferred to corresponding end-user applications.

22 Claims, 5 Drawing Sheets

OTHER PUBLICATIONS

"SyncML-Getting the mobile Internet in sync" A. Jönsson et al Ericsson Review No. 3, 2001, pp. 110-115.
"Wireless standard seeking to synch mobile devices" N. Orman Silicon Valley/San Jose Business Journal-Feb. 18, 2002.
"Breaking Down the Language Barrier" R. Wickham Wireless Review, Apr. 1, 2002.
"SyncML Representation Protocol", v 1.1, Feb. 15, 2002, from the Internet.

* cited by examiner

METHOD AND DEVICE FOR HANDLING SYNCHRONIZATION RELATED INFORMATION

CROSS REFERENCE TO RELATED APPLICATION

This application claims priority under 35 U.S.C. § 119 International Application Number PCT/IB02/01203 Apr. 15, 2002.

BACKGROUND OF THE INVENTION

1. Technical Field

The invention relates to a method and a device for handling synchronization related information, especially for synchronization and updating of portable or mobile terminals, PDA's and other stations having continuously changing databases. All popular mobile devices—handheld computers, mobile phones, pagers, laptop computers—synchronize their data with network applications, desktop calendars, and other locations where information is stored. The synchronization markup language (SyncML) technology is an open specification for data synchronization.

2. Discussion of Related Art

SyncML is used in wireless and wired environments. In general, synchronization takes place between a terminal device (e.g., a mobile phone) and a server device (e.g., an application in a local PC). To be able to understand each other the data transferred between SyncML client (the mobile phone) and SyncML server (the PC) must be coded as a SyncML document. The coding or decoding/parsing of SyncML document is done by separate application components, respectively, that other end-user applications (e.g. a UI application) can use.

Data of portable terminals, such as portable computers, PDA terminals (personal digital assistant), mobile stations or pagers, can be synchronized with network applications, applications of desktop computers or with other databases of the telecommunications system. In particular, data of calendar and e-mail applications are typically synchronized. But also non-ordinary devices will offer synchronization capability. Such a non-ordinary device may be a digital camera able to synchronize pictures with a central picture managing server providing an easy to use upload method to the user of such a digital camera.

Synchronization has been based on the use of different manufacturer-specific protocols which are incompatible. This restricts the use of terminal or data types and often causes troubles to the user. In mobile communication, in particular, it is important that data can be retrieved and updated regardless of the terminal and application used.

To improve synchronization of application data, a language known as synchronized markup language SyncML, which is based on the XML (extensible markup language), has been developed. By using a SyncML synchronization protocol, which employs messages in the SyncML format, data of any application can be synchronized between network terminals of any kind. The SyncML synchronization protocol functions both in wireless and in fixed networks and supports several transmission protocols.

The synchronized markup language (SyncML) standard provides the possibility of a manufacturer independent synchronization protocol. But the capabilities of this standardized synchronization protocol is simultaneously limited due to the standardizing process. So it is not always desired or even possible to use a synchronization coding or decoding component operation in accordance to the synchronization SyncML standard for example in case of using proprietary functionality of certain synchronization applications, if a user may set up and code synchronization related information on one's own or if the user requires special handling of the synchronization related information. But it would nonetheless be advantageous even in such a case to employ the transmitting and receiving capabilities which are provided by a communication component operation in accordance with the synchronization SyncML standard.

DISCLOSURE OF INVENTION

The object of the invention is to provide an encoding/decoding component which encodes and/or decodes synchronization related information in accordance with the synchronization SyncML standard and which in parallel provides the capability to forward or pass through, respectively, coded synchronization related information received from an application to a communication component or vice versa, respectively. The communication component is a communication component operating in accordance with the synchronization SyncML standard and is normally used therefore.

In general the passing through capability provides a more cost efficient, individually adaptable and faster solution from the end-user point of view. The concept of the present invention makes it possible to use several different specialized synchronization encoders/decoders on the same platform independently.

The object of the invention are attained by a method, an apparatus and a computer program which are Disclosed in further detail below.

According to an embodiment of the invention, a method for handling synchronization related information received from an application running on an electronic device is provided. The method comprises the operations of receiving information from an application and in case the received synchronization related information includes uncoded synchronization related information, coding said synchronization related information and transmitting said coded synchronization related information to a communication component. In case the received synchronization related information includes coded synchronization related information, passing through the synchronization related information to a communication component. The application may be able to code the synchronization related information on its own. The application may transmit the information via an application program interface (API) or via a certain pre-defined function call provided by an application program interface (API). The determination may be recognized by the function call made by the transmitting application via the application program interface (API). The electronic device may be a processing device adequate for operating synchronization like one of the aforementioned devices.

According to an embodiment of the invention, the received synchronization related information may be checked in order to determine if the received synchronization related information includes coded synchronization related information.

According to an embodiment of the invention, the handling of the synchronization related information may comprise providing header information in accordance with the synchronization related information. The header information may be transmitted in combination with the passing through of the synchronization related information.

According to an embodiment of the invention, the communication component may transmit the synchronization related information to a further electronic device for synchronizing. It is to be understood that the electronic device operating according to an embodiment of the aforementioned method and the further electronic device may be the two participating devices of an end-to-end synchronization process.

According to an embodiment of the invention, a method for handling synchronization related information received from a communication component of preferably an electronic device is provided. The method comprises the operations of receiving the synchronization related information from the communication component. In a following operation, it is determined before decoding of the synchronization related information if said synchronization related information is to be passed through. In case that the synchronization related information is not to be passed through, the synchronization related information is decoded and subsequently, the decoded synchronization related information is transmitted to an application which is preferably running on the electronic device. In case that the synchronization related information is to be passed through, the synchronization related information is passed through in an undecoded form to an application. The application may decode the passed through synchronization related information on its own.

According to an embodiment of the invention, the determination of the passing through of the synchronization related information comprises a reception of a user input. The user may be prompted to show information about the synchronization related information and may be prompted to select if the synchronization related information is dedicated to a certain application. The selection of the corresponding application may also comprise information on how the synchronization related information is to be treated, i.e. if the synchronization related information is to be passed through or to be decoded.

According to an embodiment of the invention, the determination of the passing through of the synchronization related information may comprise an analysis of header information associated with the synchronization related information. The header information may comprise information of the addressed application for the synchronization related information. The decision may be based on this obtained information.

According to an embodiment of the invention, the method may further comprise the decoding of the synchronization related information and transmission of decoded synchronization related information to the application in case it is determined the synchronization related information is not to be passed through.

According to an embodiment of the invention, the aforementioned operations may be executed by a decoding component for decoding synchronization related information.

According to an embodiment of the invention the synchronization related information may be transmitted to the application via an application program interface (API).

According to an embodiment of the invention, the communication of the synchronization related information between the electronic device and the further electronic device may be based on a synchronization protocol. Preferably, the synchronization protocol is the synchronization markup language (SyncML) protocol according to the synchronization markup language (SyncML) standard.

According to an embodiment of the invention, the synchronization protocol may be transmitted via a logical communication connection which preferably, may be based on the hyper text transfer protocol (HTTP), the wireless session protocol (WSP) or the object exchange protocol (OBEX).

Advantageously, the aforementioned methods in connection with the encoding and decoding of synchronization related information may be executed by a synchronization wrapper comprising encoding and decoding capabilities of synchronization related information.

According to an embodiment of the invention, a software tool for handling synchronization related information is provided. The software tool comprises program portions for carrying out the operations of the aforementioned methods when the software tool is implemented in a computer program and/or executed.

According to an embodiment of the invention, there is provided a computer program for handling synchronization related information. The computer program comprises program code portions for carrying out the operations of the aforementioned methods when the program is executed on a processing device. a computer or a network device.

According to an embodiment of the invention, a computer program product is provided which comprises program code portions stored on a computer readable medium for carrying out the aforementioned methods when said program product is executed on a processing device, a computer or network device.

According to an embodiment of the invention, an apparatus for handling synchronization related information received from at least one application is provided. The apparatus is adapted to execute said at least one application. Further, the apparatus comprises a wrapper component and a communication component. At least one application generates synchronization related information which is transmitted to the wrapper component. The wrapper component is adapted to execute the operations of receiving the synchronization related information from the at least one application and if the received synchronization related information includes coded synchronization related information the synchronization related information is passed through to the communication component. If the received synchronization related information includes uncoded synchronization related information the synchronization related information is coded and transmitted to the communication component.

According to an embodiment of the invention, an apparatus for handling synchronization related information received from the communication component is provided. The apparatus is adapted to execute at least one application. Further the apparatus comprises a wrapper component and a communication component. The wrapper component is adapted to execute the operations of receiving synchronization related information from the communication component, determining if the synchronization related information is to be passed through and, in this case, passing through the synchronization related information to at least one application. At least one application may receive the synchronization related information for decoding. If the synchronization related information is not to be passed through, in this case, the synchronization related information is decoded and the decoded synchronization related information is transmitted to a corresponding application to process the decoded synchronization related information.

According to an embodiment of the invention, the wrapper component of the apparatus may further be adapted to operate the operations of the method for handling synchronization related information.

BRIEF DESCRIPTION OF THE DRAWINGS

The invention will be described in greater detail by the means of preferred embodiments with reference to the accompanying drawings, in which.

BEST MODE FOR CARRYING OUT THE INVENTION

Figure 1:
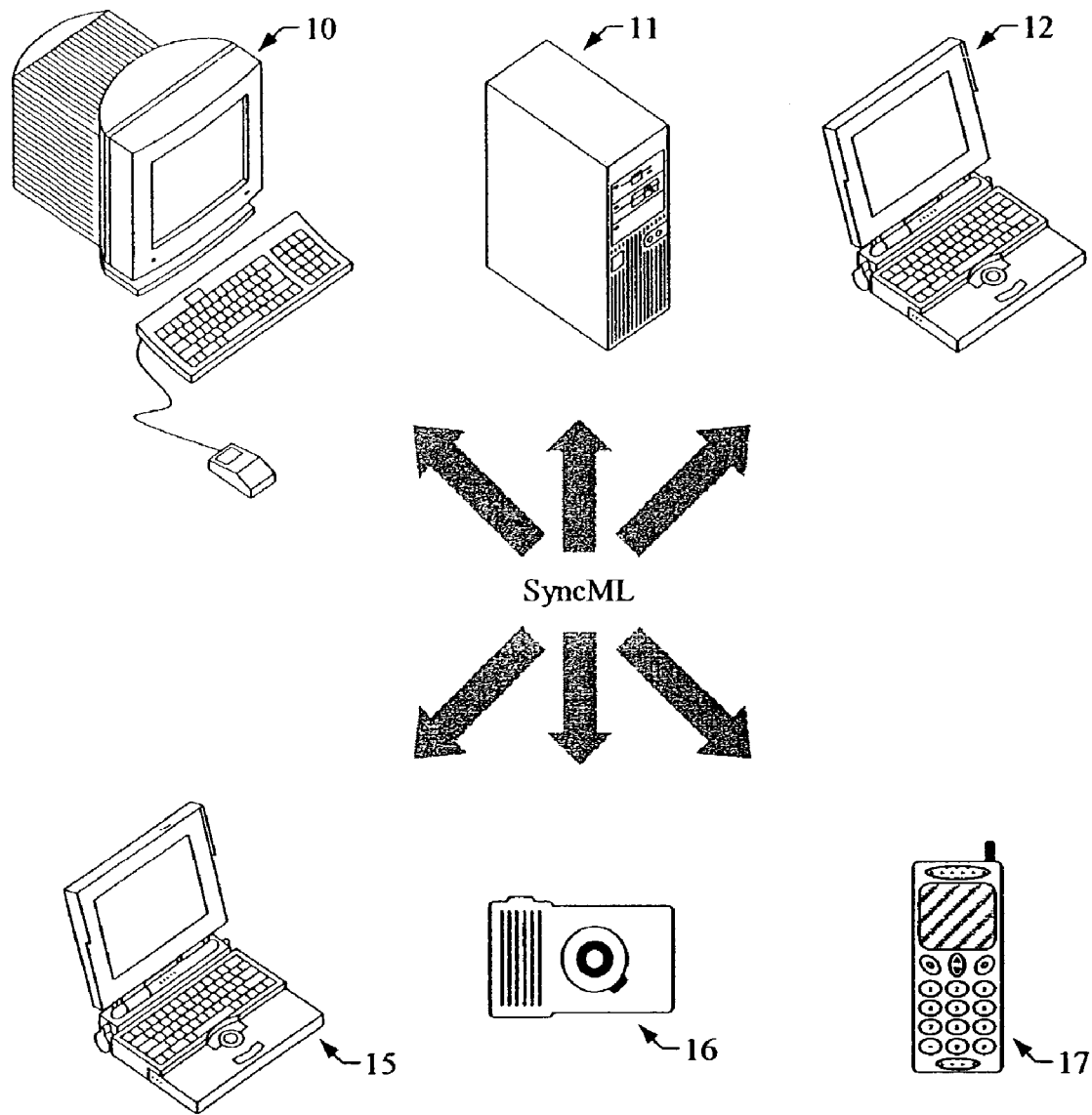
FIG. 1 shows a set of exemplary devices between which a synchronization based on the synchronization markup language (SyncML) may be performed.

In the following, the preferred embodiments of the invention will be described in a system supporting SyncML standard without limiting the invention thereto. The following description relates to the method, to the apparatus and to the system. Same or equal parts shown in the figures will be referred by the same reference numerals.

FIG. 1 shows a set of exemplary devices between which a synchronization based on the synchronization markup language (SyncML) may occur. A certain database content of preferably mobile terminals may be harmonized with database content provided by designated devices. Conventionally, mobile terminals act as synchronization clients harmonizing or synchronizing certain pre-defined data with the content of a database or several databases provided by dedicated server devices. FIG. 1 illustrates a plurality of possible client devices and server devices for the synchronization operation. Typically, client devices may be mobile stations like mobile phones 17 or personal digital assistants (PDA), mobile computers like notebooks 12, 15, digital cameras 16 or personal computers (PC). Further, dedicated synchronization server devices may be desktop computers like a personal computer 10, a dedicated network server 11 or even a mobile computer like a notebook 12, 15. It should be noted that the client device functionality is not limited to mobile terminals as described above although the presented concept of synchronization is described in view of mobile terminals connected to dedicated serving devices.

The participating synchronization devices, the client device and the server device, offer the possibility of using the SyncML synchronization service in order to harmonize data stored in both the client device and the server device. Therefore, the SyncML synchronization service allows the establishment of a synchronization session via a logical end-to-end connection between the participating devices. The SyncML synchronization service itself is based on the exchange of a synchronization document, which may be divided into a plurality of messages, comprising instructions in order to synchronize the data. The client device comprises a dedicated synchronization client agent implementing the SyncML synchronization protocol for controlling the communication of the corresponding messages, whereas the server device comprises a dedicated synchronization server agent implementing also the SyncML synchronization protocol for controlling communication of the corresponding messages, and a synchronization server engine for analyzing which changes have to be made in accordance with the synchronization document which may address a certain database or data source, respectively, with respect to a certain corresponding application of the client processing data provided by the database or data source, respectively. The synchronization may be understood as harmonizing in accordance with the analysis results, i.e. a modifying, a replacing, a deleting and similar operation of the data of the database but also the sending back of a synchronization message to the client device in order to process data stored thereby. The term database is to be understood broadly as referring to a set of data of any data source or data storage that can be updated by one and more applications.

It should be further noted that the assigning of the term client device and server device, respectively, may based on the place of the analyzing operation. Commonly, the synchronization server operates the necessary analyzing of the synchronization. The analyzing operation is operated by the server device, since the server device offers usually higher processing capabilities in comparison to the client device. Naturally, a processing device may also act as a client device and as a server device.

The description above has introduced the synchronization service based on the SyncML synchronization standard. The following description will describe components of the client device and the server device, adapted for operating a synchronization in accordance with the SyncML synchronization standard.

Figure 2:
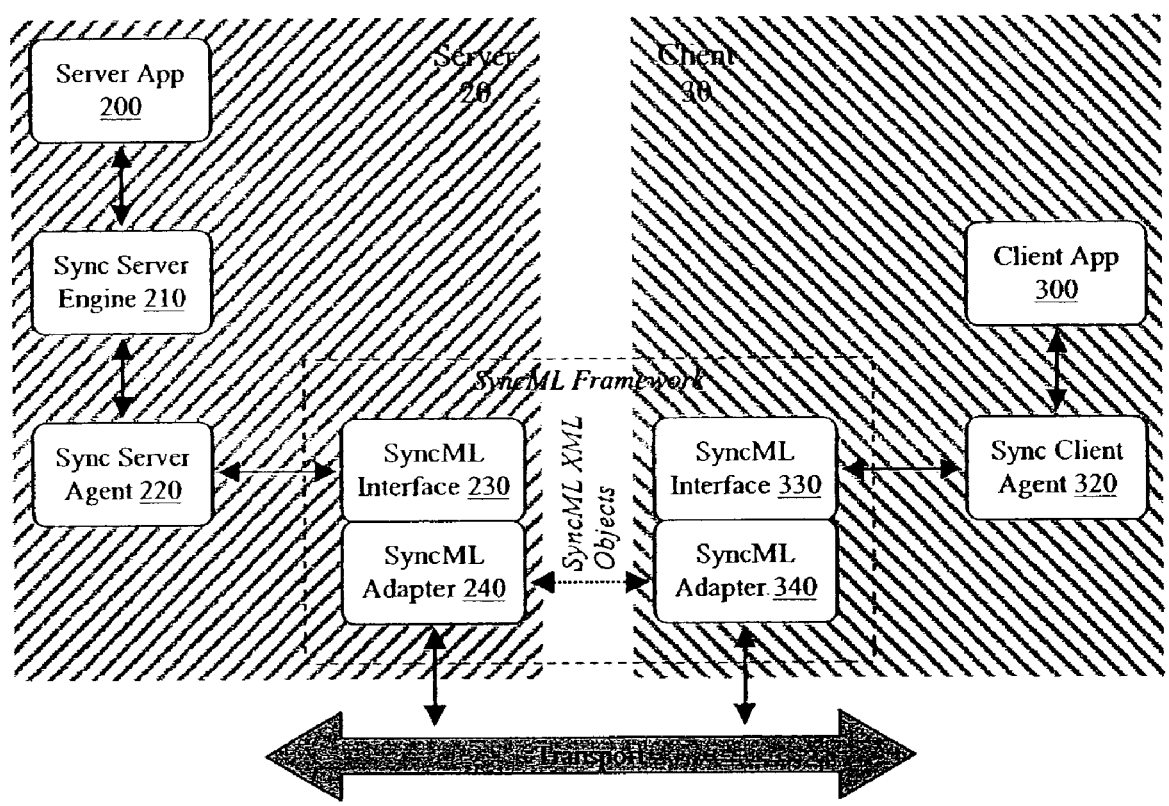
FIG. 2 shows a block diagram illustrating components of a client device and a server device both able to operate a synchronization.

FIG. 2 shows components of a client device and a server device which allow a synchronization operation between the client device and a server device based on the SyncML synchronization standard.

In FIG. 2, a server application 200 represents a networked service that provides synchronization with another counterpart client application 300. The synchronization data may be provided or processed by the server application 200 or client applications 300, respectively. The server application 200 is hosted by the server 20 which may be a server device corresponding with the server device mentioned with reference to FIG. 1. Analogously, the client application 300 is hosted by the client 30 which may be a client device corresponding with the client device mentioned with reference to FIG. 1. The synchronization is performed between a server 20 and a client 30.

The server 20 and client 30 are connected over any network. The network provides a logical communication connection between the server 20 and client 30, allowing the establishment of the end-to-end communication during the synchronization which may be termed as a synchronization session.

The client 30 may use the synchronization client agent 320 to access the network and send messages to the server via the synchronization adapter 340 and synchronization interface 330. The server 20 or server application 200, through the synchronization server agent 220, respectively, receives or sends messages, and manages the entire synchronization process through the synchronization server engine 210. Synchronization operations are conceptually bound into a synchronization package, which is a conceptual frame for one or more required synchronization messages. A synchronization message is a well-formed extended markup language (XML) document identified by the SyncML root or document element type. The document consists of a header (SyncHdr element type) and a body (SyncBody element type). The header specifies over all routing and versioning information, while the body is a container for one or more SyncML synchronization instructions. The instructions are containers for other element types that describe the specifics of the instruction, including any synchronization data or meta-information. Incorporated here, too, are features such as SyncML data formats (a common set of media types for commonly accepted information such as calendars and contacts) and SyncML capabilities exchange (in which a SyncML client and server determine what device, user, and application features each supports) are incorporated.

For example, a mobile phone acts as the SyncML client 30, and a server acts as the SyncML server 20. The client 30 sends a message to the server 20 regarding changes to data made on the client 30. The server 20 then synchronizes the data within the SyncML messages with data stored on the server 20, and returns modifications back to the client 30. The client 30 contains a synchronization client agent 320, and typically has the role of sending modifications first to the server 20. The client 30 is typically a mobile phone or PDA, and must also be capable of receiving messages back from the server 20. The server 20 contains the synchronization server agent 220 and the synchronization engine 210, and usually waits for the client 30 to initiate synchronization, although the server 20 can initiate synchronization if unsolicited instructions are supported on the transport protocol level.

Figure 3:
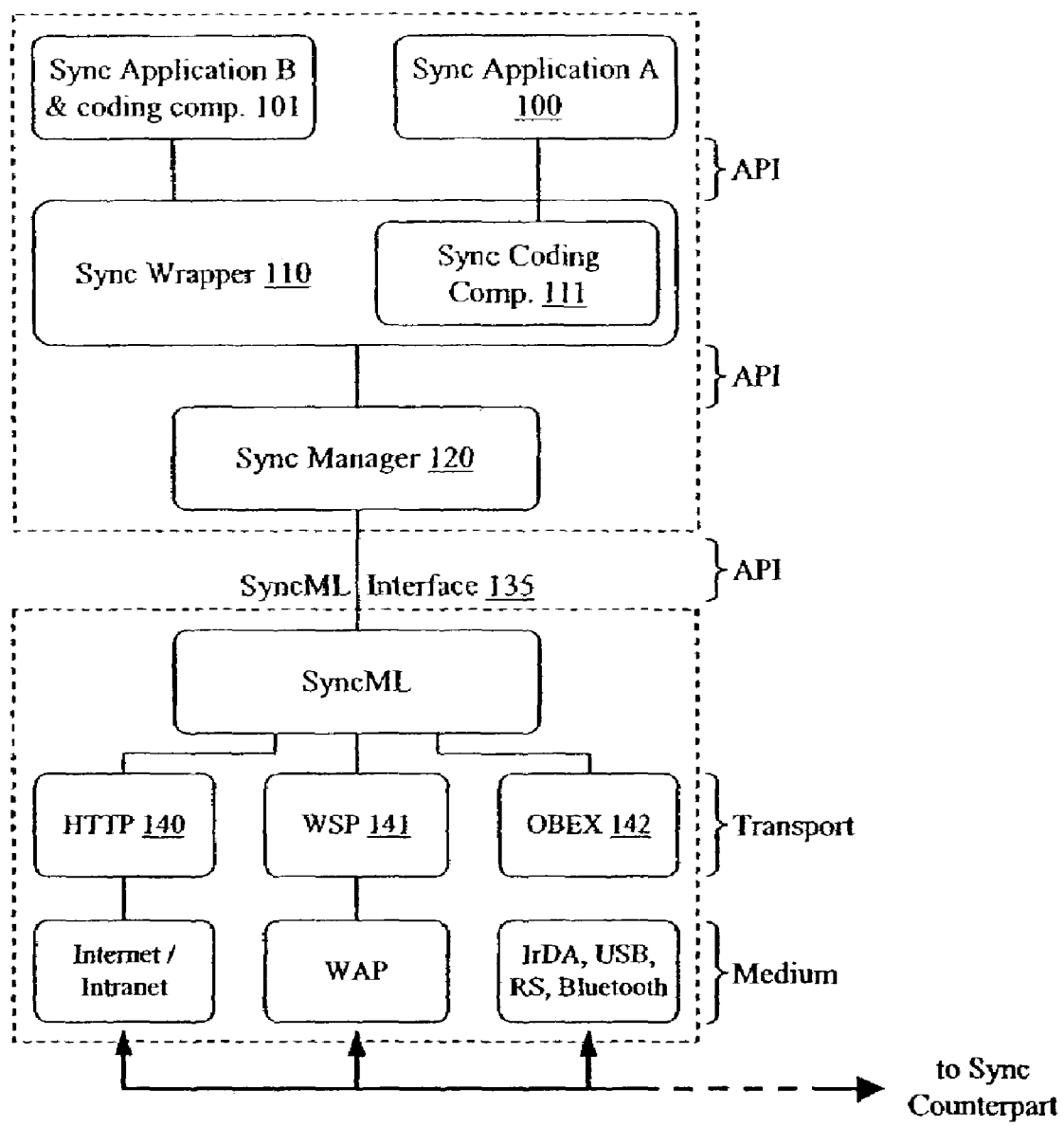
FIG. 3 shows a block diagram illustrating an embodiment of the apparatus offering synchronization document handling according to an embodiment of the invention.

FIG. 3 shows a block diagram illustrating an embodiment of the apparatus offering synchronization document handling according to an embodiment of the invention. The illustration is based on the aforementioned illustrated server components which is described with reference to FIG. 2 in order to make clear the concept of the present invention.

FIG. 3 illustrates components necessary to operate synchronization in accordance with the synchronization markup language (SyncML) protocol standard. A dedicated synchronization device, e.g. a synchronization server such as server 20 shown in FIG. 2, may comprise the illustrated components of FIG. 3. The following description will be divided into two parts, the first part is dedicated to the receiving of synchronization related information from the counterpart synchronization device, i.e. a client like client 30 shown in FIG. 2 and a transmitting of synchronization related information to the counterpart synchronization device.

Receiving

According to the aforementioned concept, the synchronization related information is bound into a synchronization package which may consist of a plurality of synchronization messages exchanged between the synchronization participating devices.

Herein, a synchronization process may be established via an appropriate logical communication connection. The logical communication connection may be provided by any communication networks in combination with transport protocols to which the synchronization protocol is adapted. A suitable communication network may be a local area network (LAN), a wide area network (WAN) which may comprise the internet and a intranet of a company but also wire-based serial networks such as universal serial bus (USB) or standardized serial communication (e.g. RS-323). The participating synchronization devices may be also connected via a wireless communication network such as a mobile network supporting global system for mobile communication (GSM) services and/or supporting general packet radio services (GPRS), a third generation mobile communication network such as a universal mobile telecommunication system (UMTS) network, a wireless local area network (WLAN), a bluetooth network or a infrared network (IrDA). The logical communication connection between the participating synchronization devices may be provided by a single communication network of the aforementioned type but also may be provided by several communication networks of the aforementioned types interconnected by dedicated network routing devices.

With respect to the SyncML protocol standard the SyncML synchronization protocol can be implemented on the top of appropriate protocols in accordance with the type of employed communication network. Appropriate protocols on which top the SyncML synchronization protocol can be implemented are the hyper text transfer protocol (HTTP), the wireless session protocol (WSP) of the wireless application protocol (WAP) standard, the object exchange protocol (OBEX) used for cable connections, such as universal serial bus (USB) or RS-232, for short-range radio frequency connections (Bluetooth) or for infrared connections (IrDA), the transport control protocol/internet protocol (TCP/IP) stack and on top of the transport layer service which is offered by the e-mail protocol (e.g. simple mail transfer protocol, SMTP).

Transfer at the lower layer can be performed according to the underlying network using e.g. short messages SMS (short message service) or other signaling type transmission methods (e.g. USSD; unstructured supplementary service data), circuit-switched data calls or packet-switched data transfer services.

A synchronization message coded on the top of a transfer protocol may be received via one of the aforementioned network media and transport protocols and the received synchronization message may be supplied to a synchronization manager 120 via a synchronization interface 135. The synchronization interface is merely an application program interface (API) to the respective employed communication adapter. FIG. 3 illustrates exemplary a communication adapter 140 based on the hyper text transfer protocol (HTTP), a communication adapter 141 based on the wireless session protocol (WSP) and a communication adapter 142 based on the object exchange protocol (OBEX). The respective media are arranged to the communication adapters.

The synchronization manager 120 or synchronization agent, respectively, receives the synchronization message containing synchronization related information. The synchronization manager 120 controls the communication of the synchronization messages and, in accordance with the synchronization markup language (SyncML) standard, transfers the synchronization related information of the synchronization message to a synchronization coding component 111. The transfer of the synchronization related information between synchronization manager 120 and synchronization coding component 111 may use an application program interface (API).

The synchronization coding component 111 manages the decoding of the synchronization related information by paring the synchronization related information and initiating appropriate operations of a synchronization application 100. The synchronization coding component 111 parses the synchronization related information and for each identified command contained in the synchronization related information a pre-defined process is initiated. The pre-defined processes are provided by the synchronization application 100 or the synchronization application 100 supplies a set of pre-defined functions to the synchronization coding component 111 to be initiated in accordance with the identified commands, respectively. The parsing, identifying and initiating of the respective processes supplied by the application 100 are operated stepwise.

It should be noted that the aforementioned concept of processing synchronization related information with respect to the synchronization markup language (SyncML) standard is limited to a pre-defined number of commands which may be identified by such a synchronization coding component 111. The respective commands can be looked up in the corresponding standard documentation *SyncML Representation Protocol, version* 1.1, February 2002.

According to the concept of the present invention the parsing and identifying of the synchronization related information is not operated by the synchronization coding component 111. Therefore the synchronization coding component 111 may be embedded into a synchronization wrapper 110. The synchronization wrapper 110 offers the possibility to supply the synchronization related information to the synchronization coding component 111 which parses and processes the synchronization related information in combination with synchronization application 100 or offers the possibility to supply the coded synchronization related information immediately to a synchronization application 101. The synchronization application 101 contains a special synchronization coding component which may be adapted to special commands contained in the synchronization related information unknown to the synchronization coding component 111. Further, the synchronization related information may need a certain treatment for parsing and/or processing which may be not provided by the synchronization coding component 111.

The synchronization wrapper 110 embedding the synchronization coding component 111 may communicate to the synchronization manager 120 and to the synchronization application 100 and synchronization application 101 via respective adapted application program interfaces.

Transmitting

A synchronization application 100 may code a synchronization message. The coding of the synchronization message may be operated in accordance with the synchronization markup language (SyncML) standard. Therefore, the synchronization application 100 may initiate the establishment of a adequate communication connection to the synchronization counterpart device if necessary. The coding of the synchronization related information itself, which is contained by the synchronization package or the synchronization messages, respectively, which result from the synchronization package, is obtained by calling dedicated functions provided by a synchronization coding component 111 depicted in FIG. 3. The dedicated functions of the synchronization coding component 111 may be provided via an application program interface (API) and allow to code commands which are provided and pre-defined by the synchronization markup language (SyncML) standard. The respective commands can be looked up in the corresponding standard documentation *SyncML Representation Protocol, version* 1.1, February 2002. The coding of the synchronization related information may be operated stepwise and finally the application may complete the coding indicated by an appropriate function call provided by the synchronization coding component 111. The completed synchronization related information may be supplied to the synchronization manager 120 or synchronization agent, respectively, controlling the communication of the synchronization message exchange. The synchronization coding component 111 and the synchronization manager may employ also an adapted application program interface (API) to communicate the synchronization related information.

The synchronization manager 120 has access to the synchronization interface 135 which is merely an application program interface (API) in order to transmit a synchronization message containing the coded synchronization related information, coded on the top of an adequate and available transfer protocol. FIG. 3 illustrates exemplary a communication adapter 140 based on the hyper text transfer protocol (HTTP), a communication adapter 141 based on the wireless session protocol (WSP) and a communication adapter 142 based on the object exchange protocol (OBEX). The respective media are arranged to the communication adapters. The synchronization manager addresses one of the available communication adapter which is able to communicate to the synchronization counterpart device.

According to the concept of the present invention the coding of the synchronization related information might not be operated by the synchronization coding component 111. Therefore the synchronization coding component 111 may be embedded into a synchronization wrapper 110. The synchronization wrapper 110 offers the possibility to provide access of the synchronization application 100 in order to employ the provided coding capability thereof or offers the possibility to supply the coded synchronization related information immediately to the synchronization manager 120. The coded synchronization related information may be supplied by a synchronization application 101 which implements an own synchronization coding component. The synchronization application 101 may contain a special synchronization coding component which may be adapted to special commands contained in the synchronization related information which are unknown to the synchronization coding component 111. Further, the synchronization related information may need a certain treatment for coding which may be not provided by the synchronization coding component 111.

The synchronization wrapper 110 embedding the synchronization coding component 111 may communicate to the synchronization manager 120 and to the synchronization application 100 and synchronization application 101 via respective adapted application program interfaces.

The communication adapters 140, 141 and 142 may be constituted by a data processing device which may be comprised by the illustrated processing device. Further, the communication adapters 140, 141 and 142 may be constituted by a code section for executing on the illustrated processing device containing instructions for carrying out the necessary processing operations.

The synchronization manager 120, the synchronization coding component 111 and the synchronization wrapper 110 may be constituted by a code section for executing on the illustrated processing device containing instructions for carrying out the necessary processing operations.

The synchronization application 101 and the synchronization application 100 may each represent a plurality of applications providing the respective functionality and capabilities of the above described synchronization application 101 and synchronization application 100. Particularly, applications similar to the synchronization application 100 are distinguished by the access to an external coding and decoding component, herein the synchronization coding component 111, for coding or parsing synchronization related information, respectively. Whereas, the applications similar to the synchronization application 101 are distinguished by including coding and decoding, respectively, functionality and capabilities of synchronization related information without the use of an external coding and decoding component such as the synchronization coding component 111, respectively.

The synchronization application 101 and the synchronization application 100 may be constituted by a code section for executing on the illustrated processing device containing instructions for carrying out the necessary processing operations.

The following flow diagrams may illustrate the operation of a synchronization wrapper embedding a synchronization coding component such as the synchronization wrapper 110 and the synchronization coding component 111 illustrated in FIG. 3.

Figure 4A:
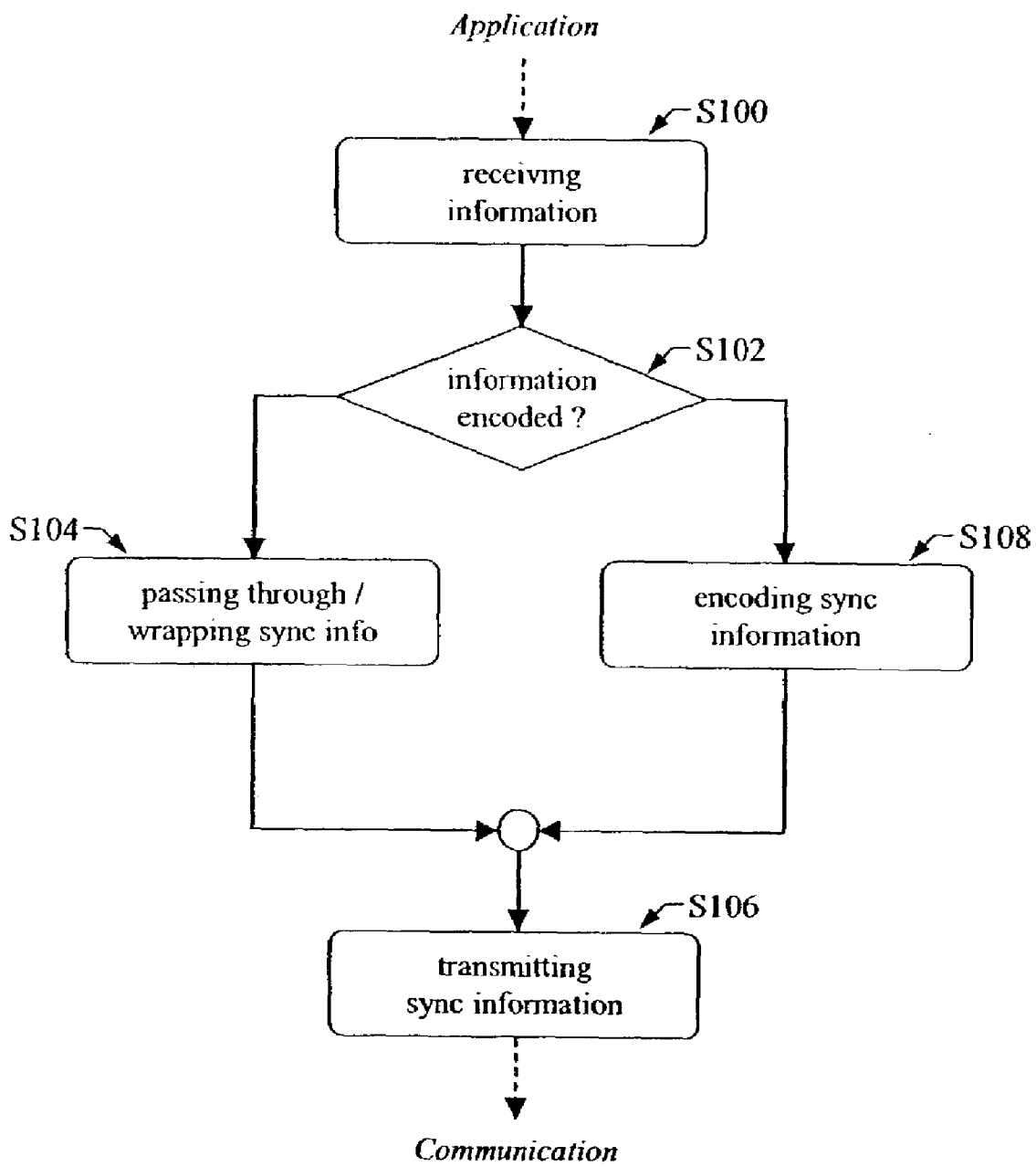
FIG. 4a shows a flow diagram illustrating a sequence of operations according to an embodiment of the method of the present invention and FIG. 4b shows a flow diagram illustrating a further sequence of operations according to an embodiment of the method of the present invention.

FIG. 4a shows a flow diagram illustrating a sequence of operations according to an embodiment of the method of the present invention.

In an operation S100, information is received from an application. Preferably, the application is a synchronizing application. Further preferably, the information is received via an application program interface (API), particularly the application program interface may be a component object model (COM) interface.

In an operation S102, the operational sequence branches depending on if the received information is coded synchronization related information or if the received information is uncoded synchronization related information. The necessary information for deciding the branching may be provided additionally by the transmitting application. Advantageously, the transmitting of the information via an application program interface (API) may allow to specify if the received information is coded synchronization related information or if the received information is uncoded synchronization related information. Therefore, the application program interface (API) may provide different functions to be called by the application.

In an operation S104, the received information is coded synchronization related information. There is no further coding of this information necessary. The synchronization related information may have been coded by the transmitting application itself. The coding by the application may offer the possibility to code synchronization commands unknown to a default coding component for encoding synchronization related information in accordance to a pre-defined synchronization standard, particularly, the synchronization markup language (SyncML) standard.

The coded synchronization related information may be passed through for transmission to a communication component. The communication component may handle the communication of the synchronization related information to a device particularly for synchronizing. The communication component may be a communication manager or a communication agent such as presented and described in FIG. 2 and FIG. 3. The device may be a client device illustrated and described with respect to FIG. 2 and FIG. 3.

The operation S 104 may provide additionally a wrapping of the synchronization related information in order to fit the requirements of a synchronization protocol. The synchronization protocol may be based on the synchronization markup language (SyncML) standard. Preferably, the wrapping of the synchronization related information may be a providing of an adequate synchronization header included in the synchronization message containing the synchronization related information.

In an operation S106, the synchronization related information is transmitted to the communication component such as the aforementioned communication component. The transmitting of the synchronization related information may be performed via an application program interface (API).

In an operation S 108, the information received from the application is the information controlling the generation of a synchronization related information. Preferably, the information is addressed to several functions provided by an application program interface (API) for encoding synchronization related information.

The encoding of the synchronization related information in operation S108 may comprise the receiving of further information controlling the generation of the synchronization related information, i.e. the synchronization related information may be generated stepwise in accordance to the subsequently received information.

When the encoding of the synchronization related information is finished the generated synchronization related information is transmitted in the following operation S106 to a communication component such as the aforementioned communication component.

The aforementioned operations may be executed by a wrapper component comprising the capability to pass through coded synchronization related information and an encoding component such as described referring to the synchronization coding component 111 illustrated in FIG. 3 having the capability to encode synchronization related information in accordance with information provided by an application.

Figure 4B:
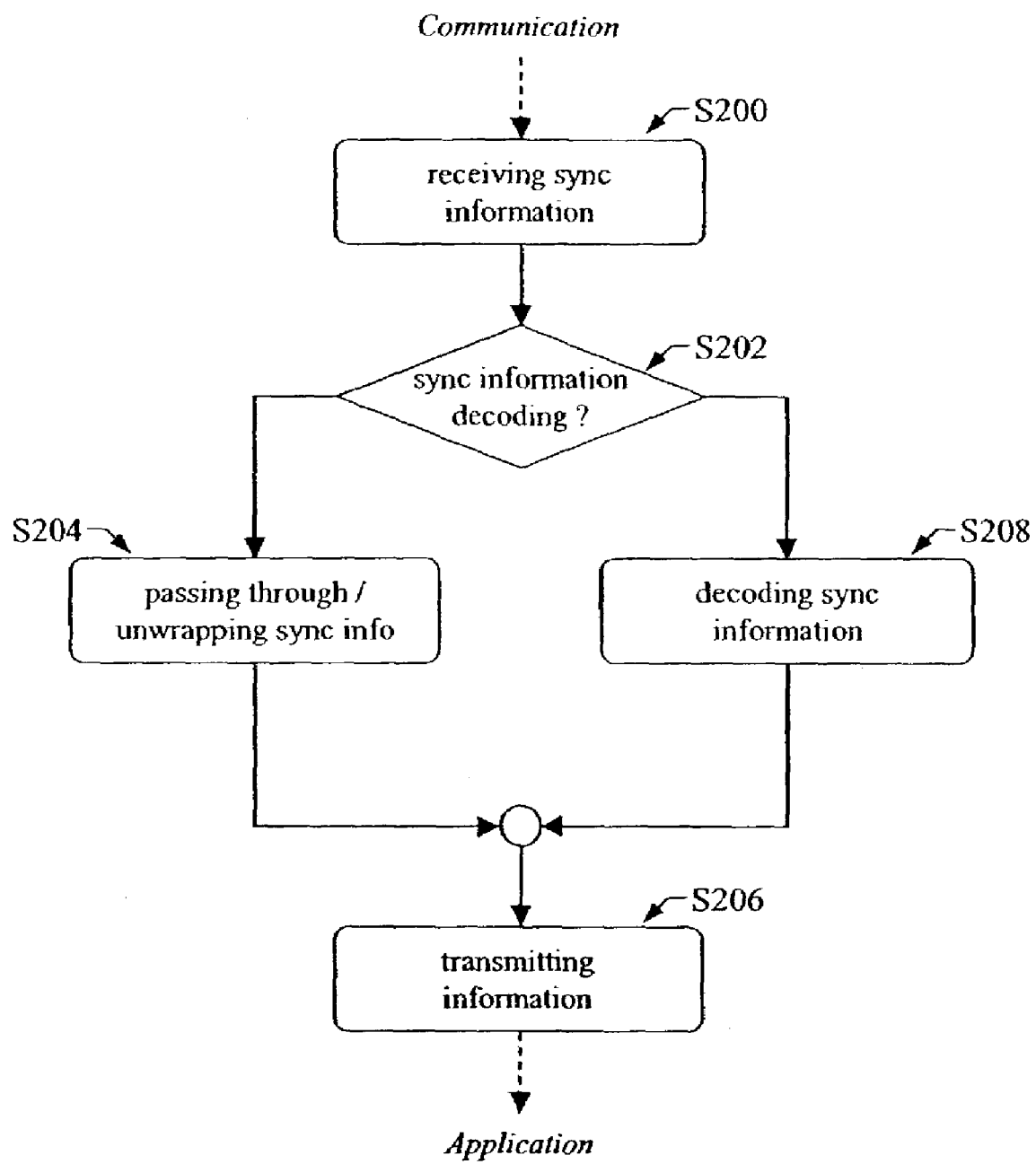

FIG. 4b shows a flow diagram illustrating a further sequence of operations according to an embodiment of the method of the present invention.

In an operation S200, synchronization related information may be received from a communication component. The communication component may handle the communication of the synchronization related information from a device particularly for synchronizing. The communication component may be a communication manager or a communication agent such as presented and described in FIG. 2 and FIG. 3. The device may be a client device illustrated and described with respect to FIG. 2 and FIG. 3.

In an operation S202, it is determined if the received synchronization related information is decoded or is passed through to an application. Accordingly, the operational sequence branches. The branching may be controlled by a user. The user may determine the following processing of the synchronization related information by a user input. The branching may be also controlled by analyzing header information which may be received in combination with the synchronization related information.

The user controlled selection may be obtained only once. Further synchronization related information of the same synchronization packages may be automatically routed in accordance to the once obtained user input. Additionally, synchronization related information identifiable by an identifier may be also automatically routed in accordance to the once obtained user input. The identifier may be contained in header information received in combination with the synchronization related information.

In an operation S204, the synchronization related information may be passed through to the application. The passing through may comprise an unwrapping of the synchronization related information. Preferably, the passing through may be an extraction of the synchronization related information, e.g. by deleting unimportant header information.

The application to which the synchronization related information is transmitted may be also defined by a user input. The user input may be obtained in combination with the user input obtained in operation S202. Further, the application to which the synchronization related information is transmitted may be defined in the header information received in combination with the synchronization related information.

The receiving application provides the capability to decode the synchronization related information. The decoding of the synchronization related information may be based on a proprietary decoding capability of the application.

In an operation S206, the synchronization related information is transmitted to the corresponding application. The synchronization related information may be transmitted to the application via a application program interface (API), particularly via a component object model (COM) interface. The synchronization related information may be transmitted as a notification to the application.

In an operation S208, the synchronization related information is decoded. The decoding of the synchronization related information may comprise a parsing of the synchronization related information and identifying of single commands in accordance with the parsing. Each identification of a command may initiate the call of a corresponding function provided by the addressed application. Therefore, the application may supply a set of pre-defined functions for initiation in accordance with the identified commands, respectively. The parsing, identifying and initiating of the respective functions supplied by the application may be operated stepwise. The provided functions of the application may be supplied via a application program interface (API), and more preferably, via a component object model (COM) interface.

The aforementioned operations may be executed by a wrapper component comprising the capability to pass through coded synchronization related information to an application and a decoding/parsing component such as described referring to the synchronization coding component 111 illustrated in FIG. 3 having the capability to decode synchronization related information in accordance with functions provided by an application.

It may be noted that advantageously, the operations illustrated in FIG. 4a and the operations illustrated in FIG. 4b may be executed by a wrapper component providing the capability to pass through coded synchronization related information to an application and a decoding/parsing component.

It will be obvious to a person skilled in the art that as the technology advances, the inventive concept can be implemented in a number of ways. The invention and its embodiments are thus not limited to the examples described above but may vary within the scope of the claims.

The invention claimed is:

1. A method, comprising:
receiving synchronization related information from an application of an electronic device;
in case said synchronization related information received from said application includes uncoded synchronization related information for controlling generation of synchronization related information,
coding said synchronization related information by the electronic device using a synchronization standard, and
transmitting the coded synchronization related information to a communication component of the electronic device using synchronization messages generated using the coded synchronization related information in accordance with a synchronization protocol of the synchronization standard and providing further synchronization messages to the communication component for transmitting said further synchronization messages to a counterpart electronic device enabling synchronization with a remote application carried out thereat; and
in case the information received from said application includes application coded synchronization related information,
passing through the application coded synchronization related information to said communication component, including wrapping the application coded synchronization related information to form synchronization messages meeting requirements of the synchronization protocol and providing the synchronization messages to the communication component for transmitting said synchronization messages to a counterpart electronic device enabling synchronization with a remote application carried out thereat.

2. The method according to claim 1, further comprising:
checking said received information in order to determine if said received information includes coded synchronization related information.

3. The method according to claim 1, wherein handling of said synchronization related information comprises:
providing header information in accordance with said synchronization related information, and transmitting said header information.

4. The method according to claim 1, wherein said communication component transmits said synchronization related information to a further electronic device for synchronizing.

5. A software tool for handling synchronization related information, comprising program code portions for carrying out the operations of claim 1, when said program is implemented in a computer program for being executed on a computer, a user terminal or a network device.

6. A computer program for handling synchronization related information, comprising program code section for carrying out the operations of claim 1, when said program is run on a computer, a user terminal or a network device.

7. A computer program product for handling synchronization related information, wherein said computer program product is comprising program code sections stored on a computer readable medium for carrying out the method of claim 1, when said program product is run on a computer, a user terminal or network device.

8. The method according to claim 1, wherein said coding is performed or said coded synchronization related information is coded using a synchronization markup language standard.

9. Method according to claim 1, wherein said transmitting further comprises wrapping of the coded synchronization related information or the application coded synchronization related information to fit requirements of a synchronization protocol.

10. A method, comprising:
receiving synchronization related information from a communication component;
determining before decoding if said synchronization related information is to be passed through;
in case said synchronization related information received from said communication component is not to be passed through,
decoding said synchronization related information using a synchronization standard, and
transmitting said decoded synchronization related information to an application; and in case said synchronization related information received from said communication component is to be passed through,
  transmitting said synchronization related information undecoded but unwrapped using said synchronization standard to an application,
wherein said application is running on an electronic device, said decoding and determining are performed by said electronic device and said electronic device comprises said communication component.

11. The method according to claim 10, wherein said determining, if said synchronization related information is to be passed through, comprises:
  receiving a user input.

12. The method according to claim 10, wherein said determining if said synchronization related information is to be passed through comprises:
  analyzing header information associated with said synchronization related information.

13. The method according to claim 10, wherein said communication component receives said synchronization related information from a further electronic device for synchronizing.

14. The method according to claim 10, wherein said synchronization related information is communicated via an application program interface (API).

15. The method according to claim 10, wherein said communication component communicates said synchronization related information to said further electronic device, based on a synchronization protocol according to the synchronization markup language (SyncML) standard.

16. The method according to claim 15, wherein said synchronization protocol is transmitted via a logical communication connection which is based on at least one protocol out of a group comprising:
  hyper text transfer protocol,
  wireless session protocol and
  object exchange protocol.

17. A software tool for handling synchronization related information, comprising program code portions for carrying out the operations of claim 10, when said program is implemented in a computer program for being executed on a computer, a user terminal or a network device.

18. A computer program for handling synchronization related information, comprising program code section for carrying out the operations of claim 10, when said program is run on a computer, a user terminal or a network device.

19. A computer program product for handling synchronization related information, wherein said computer program product is comprising program code sections stored on a computer readable medium for carrying out the method of claim 5, when said program product is run on a computer, a user terminal or network device.

20. An apparatus, comprising:
  at least one application configured to provide synchronization related information;
  a synchronization and coding component, adapted to receive said synchronization related information from said at least one application, and in case said received synchronization related information includes uncoded synchronization related information is further configured to code said synchronization related information using a synchronization standard, further configured to provide the synchronization messages generated using using the coded synchronization related information in accordance with a synchronization protocol of the synchronization standard to a communication component;
  a wrapper component, adapted to receive said synchronization related information from said at least one application, and in case said received synchronization related information includes coded synchronization related information, configured to wrap the application coded synchronization related information and to provide further synchronization messages meeting requirements of the synchronization protocol to the communication component; and
  a communication component, responsive to said synchronization messages and further synchronization messages configured to transmit said synchronization and further synchronization messages to a counterpart electronic device enabling synchronization with a remote application carried out thereat.

21. The apparatus according to claim 20, wherein said wrapper component is adapted to execute operations of receiving said synchronization related information and determining if said synchronization related information is to be passed through.

22. The apparatus according to claim 20, wherein said coded synchronization related information is coded using a pre-defined synchronization standard.

* * * * *

UNITED STATES PATENT AND TRADEMARK OFFICE
CERTIFICATE OF CORRECTION

PATENT NO.         : 7,308,642 B2                                      Page 1 of 1
APPLICATION NO. : 10/411074
DATED              : December 11, 2007
INVENTOR(S)        : Jouni Rapakko, Mika Martikainen and Sami Pajusaari It is certified that error appears in the above-identified patent and that said Letters Patent is hereby corrected as shown below:

In column 15, line 32, which is claim 16, line 1, "15" should be -- 5 --.

In column 16, line 5, which is claim 19, line 5, "5" should be -- 10 --.

In column 16, line 17, which is claim 20, line 11, second occurrence of "using" should be deleted.

Also wrong in amended claim.

Signed and Sealed this

Twenty-fourth Day of February, 2009

JOHN DOLL
*Acting Director of the United States Patent and Trademark Office*